(12) United States Patent
Lechnick et al.

(10) Patent No.: US 8,211,213 B2
(45) Date of Patent: Jul. 3, 2012

(54) MAINTAINING LOWERED CO IN A $CO_2$ PRODUCT STREAM IN A PROCESS FOR TREATING SYNTHESIS GAS

(75) Inventors: William J. Lechnick, Glen Ellyn, IL (US); Leonid Bresler, Northbrook, IL (US); Nagaraju Palla, Woodridge, IL (US)

(73) Assignee: UOP LLC, Des Plaines, IL (US)

( * ) Notice: Subject to any disclaimer, the term of this patent is extended or adjusted under 35 U.S.C. 154(b) by 282 days.

(21) Appl. No.: 12/632,244

(22) Filed: Dec. 7, 2009

(65) Prior Publication Data

US 2011/0132193 A1    Jun. 9, 2011

(51) Int. Cl.
*B01D 53/14* (2006.01)

(52) U.S. Cl. ........ 95/159; 95/160; 95/169; 95/191; 95/199; 95/207; 95/235; 95/236

(58) Field of Classification Search ............ 95/159–169, 95/172–174, 177, 181, 183–199, 235–236
See application file for complete search history.

(56) References Cited

U.S. PATENT DOCUMENTS

| | | | | |
|---|---|---|---|---|
| 3,215,623 A * | 11/1965 | Hix | ............... | 210/671 |
| 3,877,893 A * | 4/1975 | Sweny et al. | .................... | 95/162 |
| 4,052,176 A * | 10/1977 | Child et al. | ..................... | 95/161 |
| 4,242,108 A * | 12/1980 | Nicholas et al. | ................ | 95/166 |
| 4,254,094 A * | 3/1981 | Hegarty | ..................... | 423/658.3 |
| 4,261,964 A * | 4/1981 | Scott et al. | ..................... | 423/450 |
| 4,524,581 A * | 6/1985 | Cascone et al. | ................. | 60/781 |
| 4,552,572 A * | 11/1985 | Galstaun | ......................... | 95/161 |
| 552,975 A | 10/1992 | Fong et al. | | |
| 6,090,356 A | 7/2000 | Jahnke et al. | | |
| 6,269,657 B1 * | 8/2001 | McNeil | ........................... | 62/631 |
| 6,521,143 B1 * | 2/2003 | Genkin et al. | ................. | 252/373 |
| 6,596,780 B2 | 7/2003 | Jahnke et al. | | |
| 7,503,947 B2 | 3/2009 | Barnicki | | |
| 2006/0236697 A1 | 10/2006 | Rao et al. | | |
| 2007/0129450 A1 | 6/2007 | Barnicki et al. | | |
| 2009/0019767 A1 | 1/2009 | Abughazaleh et al. | | |
| 2009/0126273 A1 | 5/2009 | Barnicki | | |

FOREIGN PATENT DOCUMENTS

WO    WO 2008/103467 A1    8/2008

OTHER PUBLICATIONS

U.S. Appl. No. 12/566,822, filed Sep. 25, 2009, Lechnick et al.
Ma et al., A novel carbon supported PtAuFe as CO-tolerant anode catalyst for proton exchange membrane fuel cells, Catalysis Communications 8(6) 2007 p. 921-925, Elsevier.

(Continued)

*Primary Examiner* — Duane Smith
*Assistant Examiner* — Ives Wu
(74) *Attorney, Agent, or Firm* — Mark Goldberg (57) ABSTRACT

The invention involves a process for maintaining a low level of carbon monoxide in a carbon dioxide product stream and also for keeping the carbon monoxide out of the fully shifted synthesis gas. The overall process is a process for treating both fully shifted and partially shifted or unshifted synthesis gas. The carbon monoxide is separately removed by a carbon monoxide stripping column and returned to the partially shifted or unshifted synthesis gas which can then undergo a shift reaction to convert the carbon monoxide to carbon dioxide.

17 Claims, 6 Drawing Sheets

OTHER PUBLICATIONS

Choi et al., Optimal design of synthesis gas production process with recycled carbon dioxide utilization, Industrial & Engineering Chemistry Research 47(2) 2008 p. 323-331.

Chiesa, et al., Shift reactors and physical absorption for low-CO2 emission IGCCs, Intl. Gas Turbine Inst. (Stockholm 1998), Journal of Engineering V121 295-305 (Apr. 1999).

Heintz et al., Novel physical solvents for selective CO2 capture from fuel gas streams . . . , Energy and Fuels 22(6) 2008 p. 3824-3827 American Chemical Society.

Abu-Zahra et al., New process concepts for CO2 post-combustion capture process integrated with co-production of hydrogen, Intl. Jour of Hydrogen Energy 34(9) 2009 p. 3992-4004.

Michaels et al., Hydrogen production via the k-t gasification process current economic and tech. aspects, 85th AICHE Natl Mtg. (Phila. 1978) PREPR. N. 53C 18P.

* cited by examiner

MAINTAINING LOWERED CO IN A CO$_2$ PRODUCT STREAM IN A PROCESS FOR TREATING SYNTHESIS GAS

BACKGROUND OF THE INVENTION

This invention generally relates to a process for a gas removal zone, such as an acid gas removal zone. More specifically, this invention relates to improvements in efficiency of such processes in which the level of carbon monoxide is reduced from the carbon dioxide that is being removed.

In gasification applications in which the final product is liquid fuels or chemicals, typically both a fully shifted and a partially shifted or unshifted feed must be treated in a process that removes the sulfur compounds (including H$_2$S and COS) and CO$_2$. Among the processes that can provide such treatment are the Selexol® process—using a mixture of dimethyl ethers of polyethylene glycol (UOP LLC, Des Plaines, Ill.), the Rectisol® process—using a methanol solvent (licensed by both Linde A G, Polach, Germany and Lurgi A G, Frankfurt Am Main Germany), the Sulfinol® process—using a mixture of sulfolane and an aqueous solution of either di-isopropanol amine or methyl-diethanol amine (Jacobs, Pasadena, Calif.), the Flexsorb® process—using a proprietary solvent (ExxonMobil Research and Engineering, Fairfax, Va.), the Morphysorb® process—using a mixture of n-formylmorpholine and n-acetylmorpholine (Uhde GmbH, Dortmund, Germany) and the Purisol® process using N-Methyl-2-Pyrrolidone (NMP) (Lurgi A G, Frankfurt Am Main Germany). Each of these processes employs a solvent that absorbs the sulfur compounds and/or carbon dioxide from an acid gas.

The most straightforward set-up for these types of processes is a separate train for both feeds. From a capital cost stand-point it is advantageous to have separate H$_2$S and CO$_2$ absorbers for the 2 feeds and common equipment for the remainder of the process. These set-ups are typically able to meet the sulfur specs for the treated gases and product CO$_2$ without problems. However, the electricity requirements for a CO$_2$ recycle compressor within the process can become excessive as the CO specification in the product CO$_2$ is reduced below 1 mol-%. In current applications 1000 ppmv CO specifications for the product CO$_2$ are becoming the industry norm. The difficulty in keeping CO out of the product CO$_2$ is due to the high levels in the partially shifted or unshifted feed and the relatively large absorption of CO in the H$_2$S and CO$_2$ absorbers for this feed. The large quantities of recycle gas from the CO$_2$ recycle compressor ultimately increase the semi-lean and lean solvent requirements and associated utilities such as refrigeration and reboiler duty to undesirable levels as well. An additional restriction on the treated fully shifted syngas that makes some options for limiting the CO in the product CO$_2$ unusable due to a limit on the CO contamination that is allowable from the partially shifted or unshifted gas. Other designs were disclosed in U.S. application Ser. No. 12/566,822 filed Sep. 25, 2009 in which the 1000 ppmv CO specification for the product CO$_2$ is maintained while minimizing utility requirements by transferring the absorbed CO from the partially treated or untreated syngas to the fully shifted syngas. However, these designs are sometimes unacceptable because despite reductions in CO in the CO$_2$ stream, they can increase the CO in the treated fully shifted syngas by 20 to 30%.

SUMMARY OF THE INVENTION

The invention provides a process for separation, recovery and utilization of gas streams comprising sulfur compounds, carbon dioxide and carbon monoxide from a synthesis gas (also referred to herein as "syngas") comprising an unshifted synthesis gas or a partially shifted synthesis gas produced from high pressure partial oxidation of a hydrocarbonaceous reactant while removing carbon monoxide from these gas streams and concentrating CO in a partially shifted or unshifted synthesis gas stream. The process comprises first contacting the synthesis gas with a first liquid solvent in a first acidic gas removal unit to selectively absorb and remove at least a portion of carbon dioxide from the synthesis gas and to produce a purified synthesis gas; and then sending a portion of the first liquid solvent to a second acidic gas removal unit wherein at least a portion of carbon dioxide is contacted with the first liquid solvent mixed with a second liquid solvent to remove CO$_2$ from a shifted synthesis gas to produce a purified shifted synthesis gas. The process further comprises two options for maintaining the CO level at an acceptable level through the use of one or more CO stripping columns. The CO levels in the product CO$_2$ are kept at acceptable levels without increasing the CO in the treated fully shifted syngas via a CO stripping column. The solvent from the CO$_2$ absorber for the partially shifted or unshifted syngas is routed to the CO stripping column where it is counter currently contacted with treated fully shifted syngas. The fully shifted syngas effectively removes the CO that is absorbed from the partially shifted or unshifted syngas from the solvent and prevents it from entering the product CO$_2$. The overhead vapor stream from the CO stripping column that contains the desorbed CO is compressed, cooled, and then returned to the CO$_2$ absorber for the partially shifted or unshifted syngas.

A second option for minimizing the amount of CO from the partially shifted or unshifted syngas that contaminates the fully shifted syngas is to return the overhead from the H$_2$S concentrator and rich solution flash to the H$_2$S absorber for the partially shifted or unshifted syngas rather than the H$_2$S absorber for the fully shifted syngas. This option is a lower priority alternative than the CO stripping column as the amount of CO in the H$_2$S concentrator and rich solution flash overhead streams is much less than the CO that is removed in the CO stripping column. Also, sending these overhead streams to the H$_2$S absorber for the partially shifted or unshifted syngas noticeably increases the solvent requirement for this absorber.

DETAILED DESCRIPTION OF THE INVENTION

As used herein, the term "stream" can be a stream including various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated $C_1$, $C_2$, $C_3$ ... $C_n$ where "n" represents the number of carbon atoms in the one or more hydrocarbon molecules. Additionally, characterizing a stream as, e.g., a "partially-lean solvent stream" or a "lean solvent stream" can mean a stream including or rich in, respectively, at least one partially-lean solvent or lean solvent.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "vapor" can mean a gas or a dispersion that may include or consist of one or more hydrocarbons.

As used herein, the term "cooler" can mean a device cooling a fluid with water.

As used herein, the term "chiller" can mean a device cooling a fluid to a temperature below that obtainable by only using water. Typically, a chiller may use a refrigerant such as ammonia, a hydrocarbon or a hydrofluorocarbon.

As used herein, the term "rich" can mean an amount of generally at least about 30%, or about 30% to about 70%, by mole, of a compound or class of compounds in a stream.

As used herein, the term "absorber" can include an adsorber, and relates, but is not limited to, absorption and/or adsorption.

As depicted herein, process flow lines in the drawings can be referred to as lines, effluents, streams, or portions. A line can contain one or more effluents, streams or portions.

Figure 1:
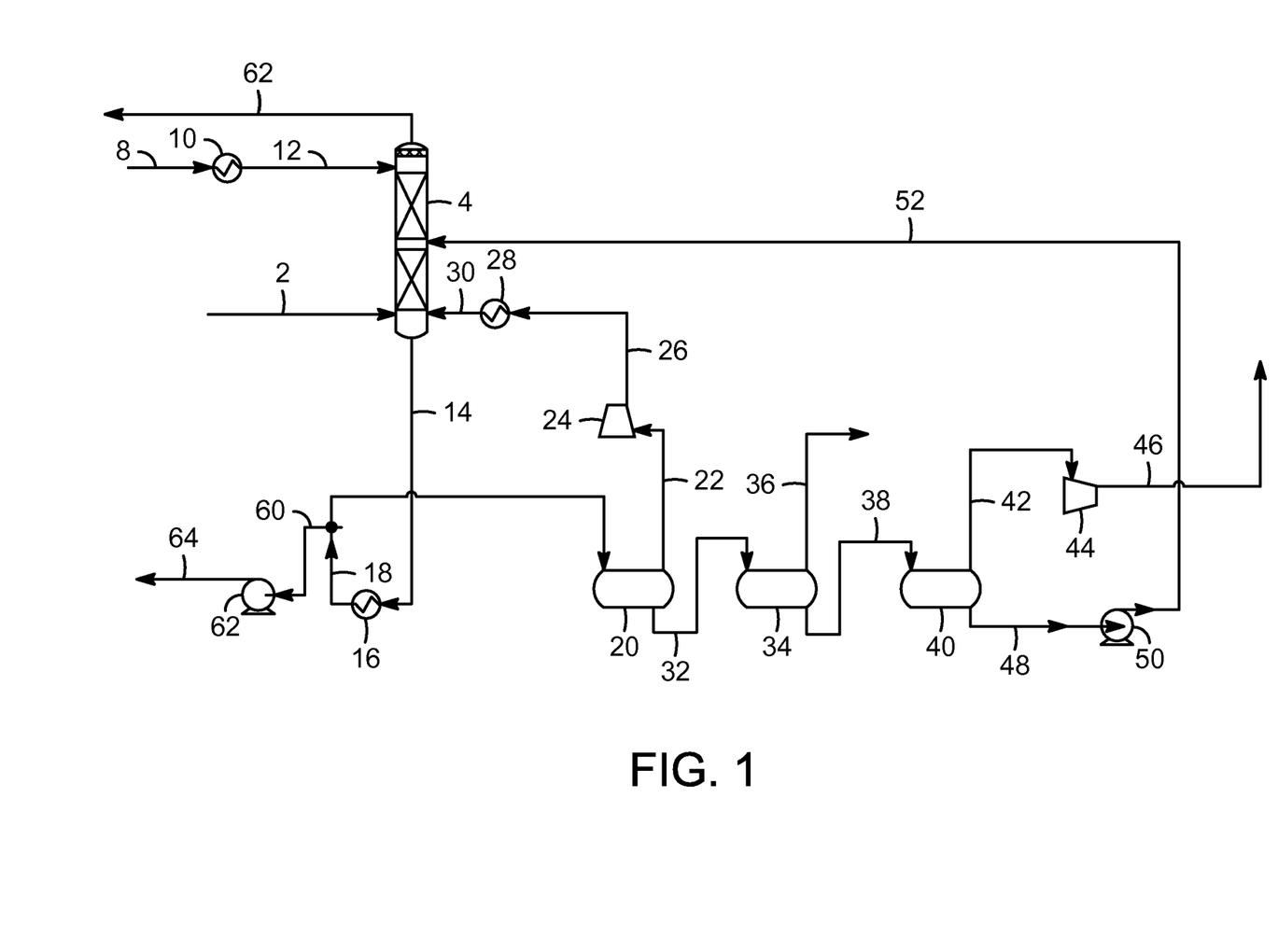
FIG. 1 shows the carbon dioxide removal section for an absorbent process for treating a single synthesis gas stream.
Figure 2:
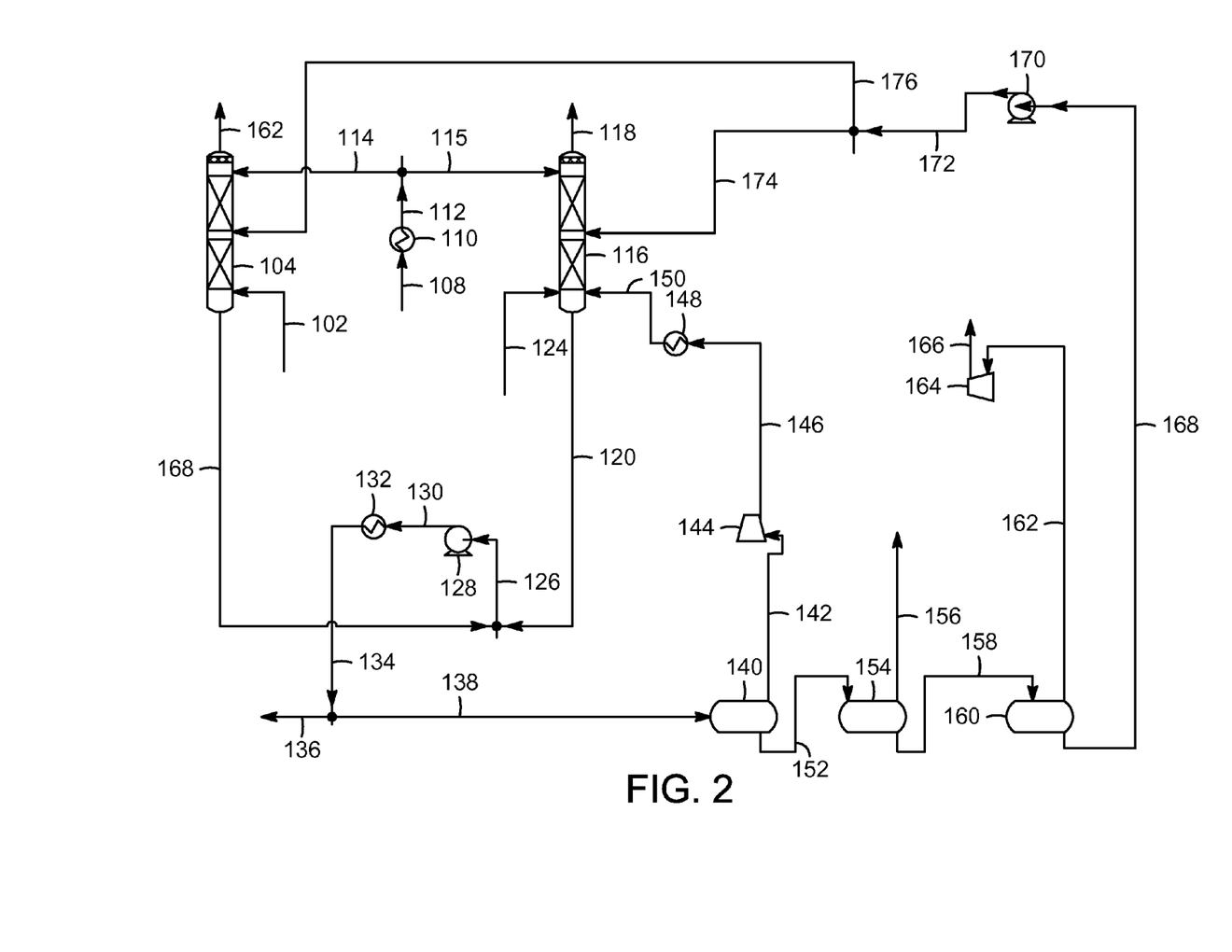
FIG. 2 shows the carbon dioxide removal sections of an absorbent process for processing both a fully shifted and an unshifted or partially shifted feed using separate absorbers for two feed gases but equipment in common for other parts of the process.

Often, a sour gas, such as a syngas, from a gasifier is treated with a solvent in at least one absorber to selectively remove one or more sulfur compounds, such as a hydrogen sulfide or a carbonyl sulfide, and carbon dioxide. It is sometimes desired to produce large quantities of hydrogen along with power from a gasification unit. In such instances a portion of the syngas from the gasifier is shifted to hydrogen in a reactor according to the reaction $CO+H_2O \rightarrow CO_2+H_2$. See for example U.S. Pat. No. 5,152,975 to Fong et al., incorporated herein by reference. The remainder of the syngas is cooled without shifting and, after further processing, sent to a combustion turbine. In addition, in gasification applications in which the final product is liquid fuels or chemicals, typically both a fully shifted and a partially shifted or unshifted feed must be treated in a process that removes the sulfur compounds ($H_2S$ and COS) and $CO_2$. There are several commercial processes for this application that are currently being marketed, including the Selexol® process—using a mixture of dimethyl ethers of polyethylene glycol (UOP LLC, Des Plaines, Ill.), the Rectisol® process—using a methanol solvent (licensed by both Linde A G, Polach, Germany and Lurgi A G, Frankfurt Am Main Germany), the Sulfinol® process—using a mixture of sulfolane and an aqueous solution of either di-isopropanol amine or methyl-diethanol amine (Jacobs, Pasadena, Calif.), the Flexsorb® process—using a proprietary solvent (ExxonMobil Research and Engineering, Fairfax, Va.), the Morphysorb® process—using a mixture of n-formylmorpholine and n-acetylmorpholine (Uhde GmbH, Dortmund, Germany) and the Purisol® process using N-Methyl-2-Pyrrolidone (NMP) (Lurgi A G, Frankfurt Am Main Germany). Each of these processes employs a solvent that absorbs the sulfur compounds and/or carbon dioxide from an acid gas. The most straightforward set-up for these types of processes is a separate train for both feeds similar to what is pictured in FIG. 1. From a capital cost stand-point, it is advantageous to have separate $H_2S$ and $CO_2$ absorbers for the two feeds and common equipment for the remainder of the process similar to what is pictured in FIG. 2. The set-up in FIG. 2 is typically able to meet the sulfur specifications for the treated gases and product $CO_2$ (using a medium pressure vent $CO_2$ and $CO_2$ from a vacuum compressor in FIGS. 1 and 2) without problems. However, the electricity requirements for the $CO_2$ recycle compressor become excessive as the CO spec in the product $CO_2$ is reduced below 1 mol-%. The difficulty in keeping CO out of the product $CO_2$ is due to the high levels of CO in the partially shifted or unshifted feed and the relatively large absorption of CO in the $H_2S$ and $CO_2$ Absorbers for this feed. In current applications 1000 ppmv CO limits in the product $CO_2$ are becoming the normal specification. The large quantities of recycle gas from the $CO_2$ recycle compressor ultimately increase the semi-lean and lean solvent requirements and associated utilities such as refrigeration and reboiler duty to undesirable levels as well.

Figure 3:
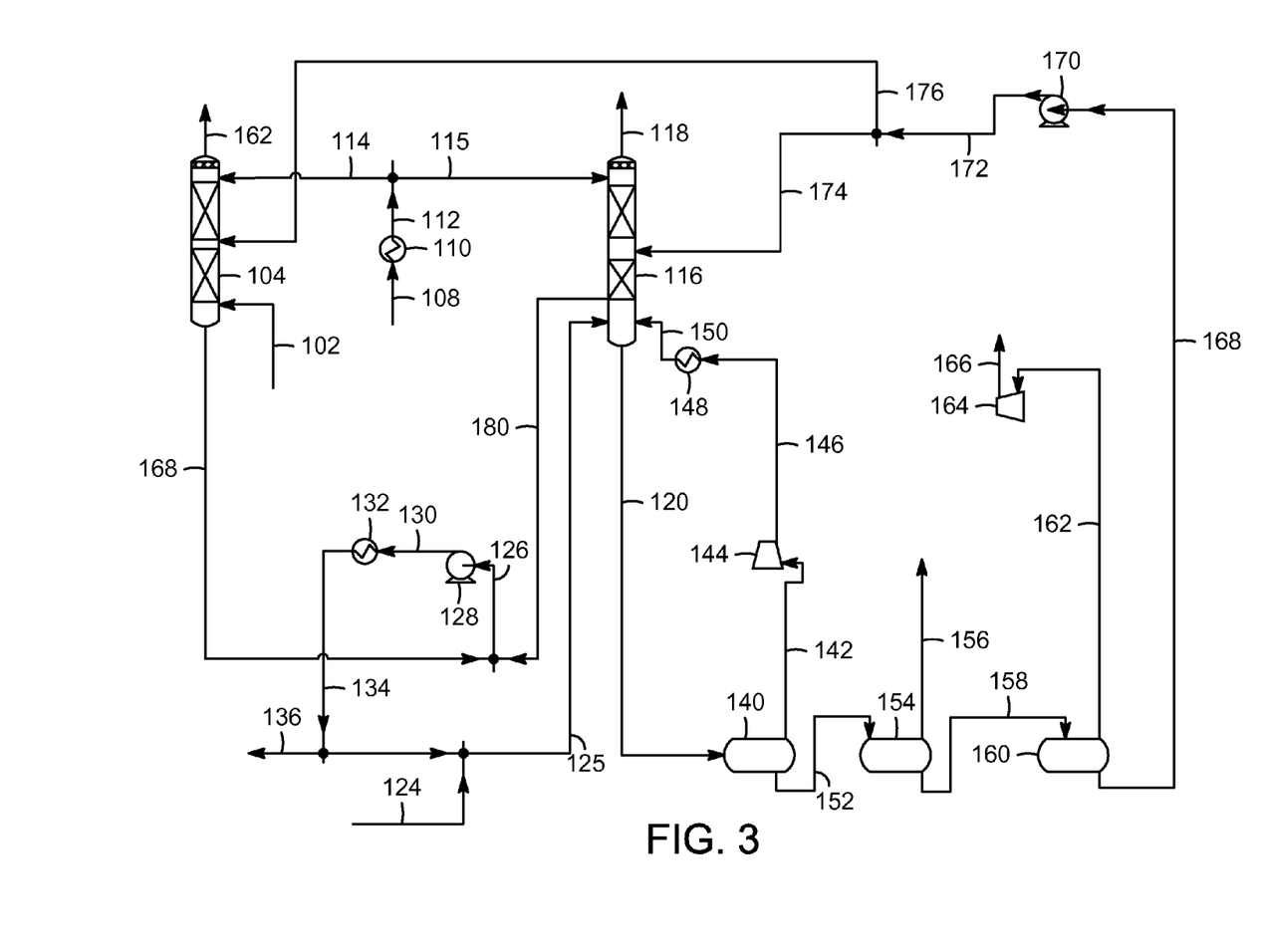
FIG. 3 shows carbon dioxide removal sections for an absorbent process for processing both shifted and unshifted or partially shifted feeds that minimize the carbon monoxide in a product carbon dioxide stream.

The CO levels in the product $CO_2$ are kept at manageable levels by transferring the CO that is absorbed in the $H_2S$ and $CO_2$ absorbers for the partially shifted or unshifted syngas to the treated fully shifted syngas. This transfer is acceptable as long as the additional CO in the treated fully shifted syngas does not adversely affect its properties, which is the case for most applications. The absorbed CO is transferred to the fully shifted syngas by combining the solvent from the bottom of the $CO_2$ absorber for the partially shifted or unshifted syngas with sidedraw solvent from the $CO_2$ absorber for the fully shifted syngas and returning the combined solvent to the $CO_2$ absorber for the fully shifted syngas (FIG. 3). Prior to returning the solvent to the $CO_2$ absorber for the fully shifted syngas it is chilled and contacted with overhead vapor from the $H_2S$ absorber for the fully shifted syngas to increase the $CO_2$ loading. The increased $CO_2$ loading combined with the relatively low level of CO in the fully shifted syngas provides a driving force that causes desorption of much of the CO in the $CO_2$ absorber into the fully shifted syngas. This desorption effectively removes the CO that is absorbed from the partially shifted or unshifted syngas from the solvent and prevents it from entering the product $CO_2$. One design based on the FIG. 3 configuration had electricity requirements of slightly less than 12 mW. Designs based on separating the 2 feeds into separate trains (as in FIG. 1), having separate absorbers for the 2 feeds without the transfer of CO into the fully shifted gas (as in FIG. 2), or a variation of the separate absorbers case in which the partially shifted or unshifted syngas has its own recycle flash and compressor, require a minimum of 10 mW more electricity to operate even when the 1000 ppmv CO spec in the product $CO_2$ is met.

Figure 4:
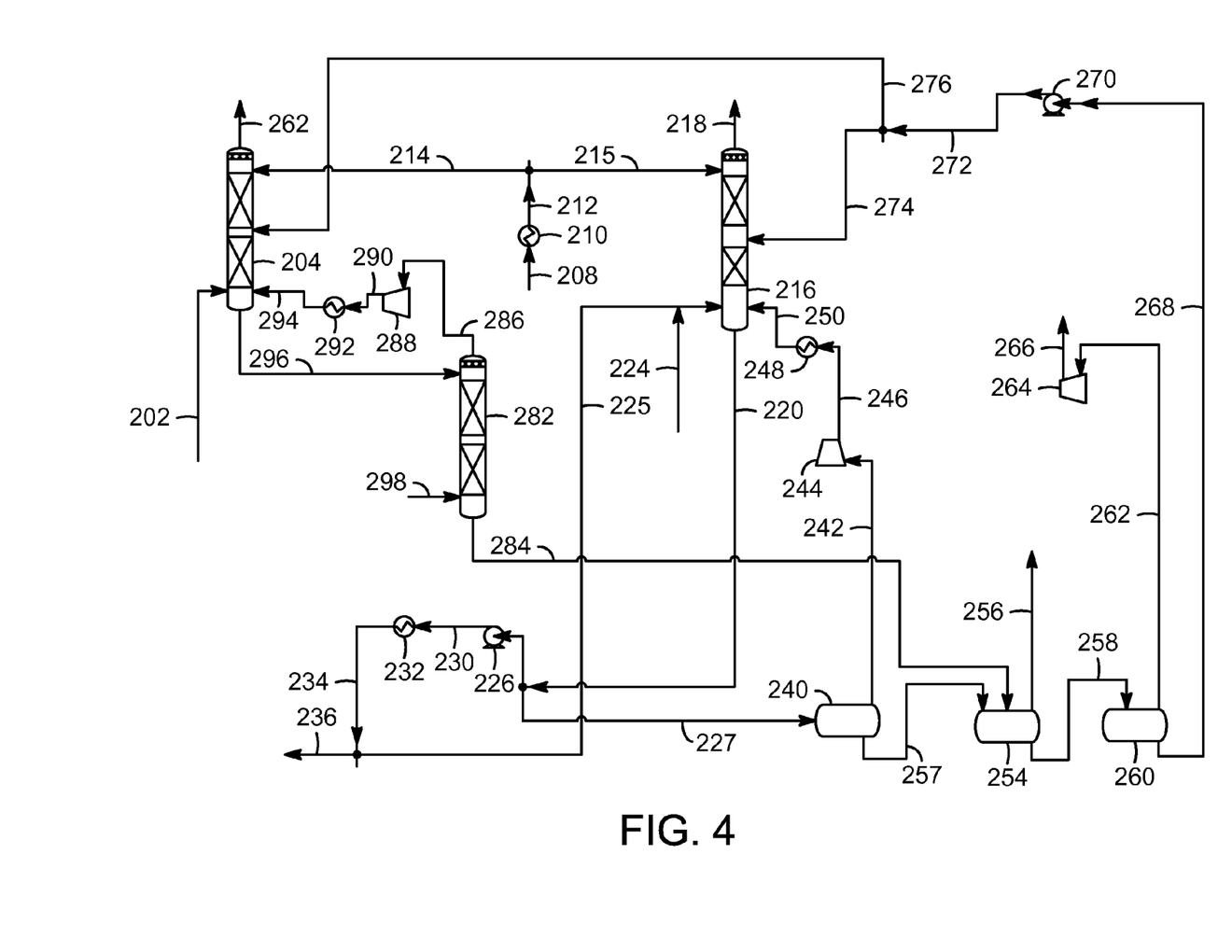
FIG. 4 shows a process for process both shifted and unshifted or partially shifted feeds that minimize carbon monoxide in product carbon dioxide by use of a carbon monoxide stripping column.
Figure 5:
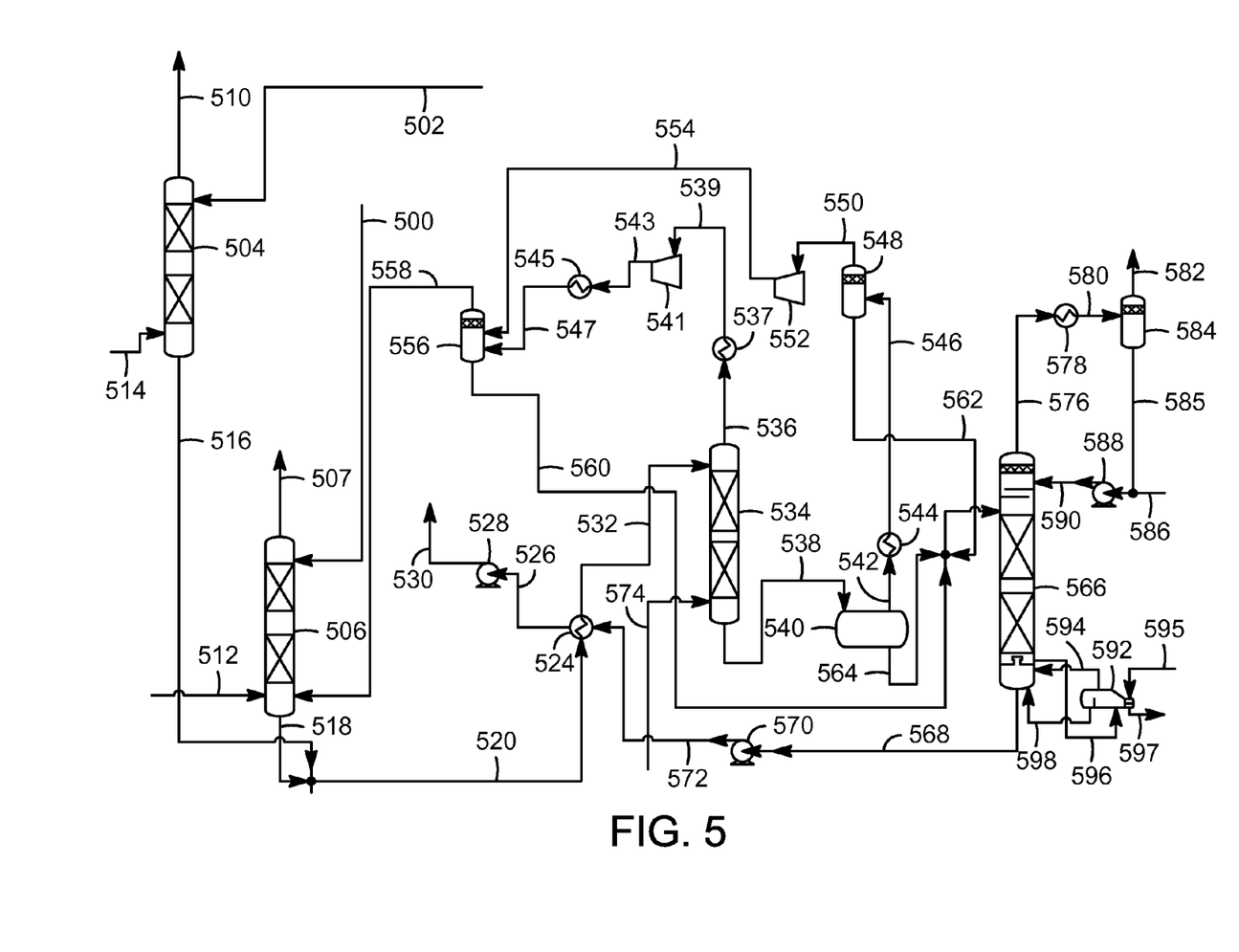
FIG. 5 shows a sulfur removal section for an absorbent process for processing both shifted and unshifted or partially shifted feeds using separate absorbers for two feed gases but common equipment elsewhere in the process.
Figure 6:
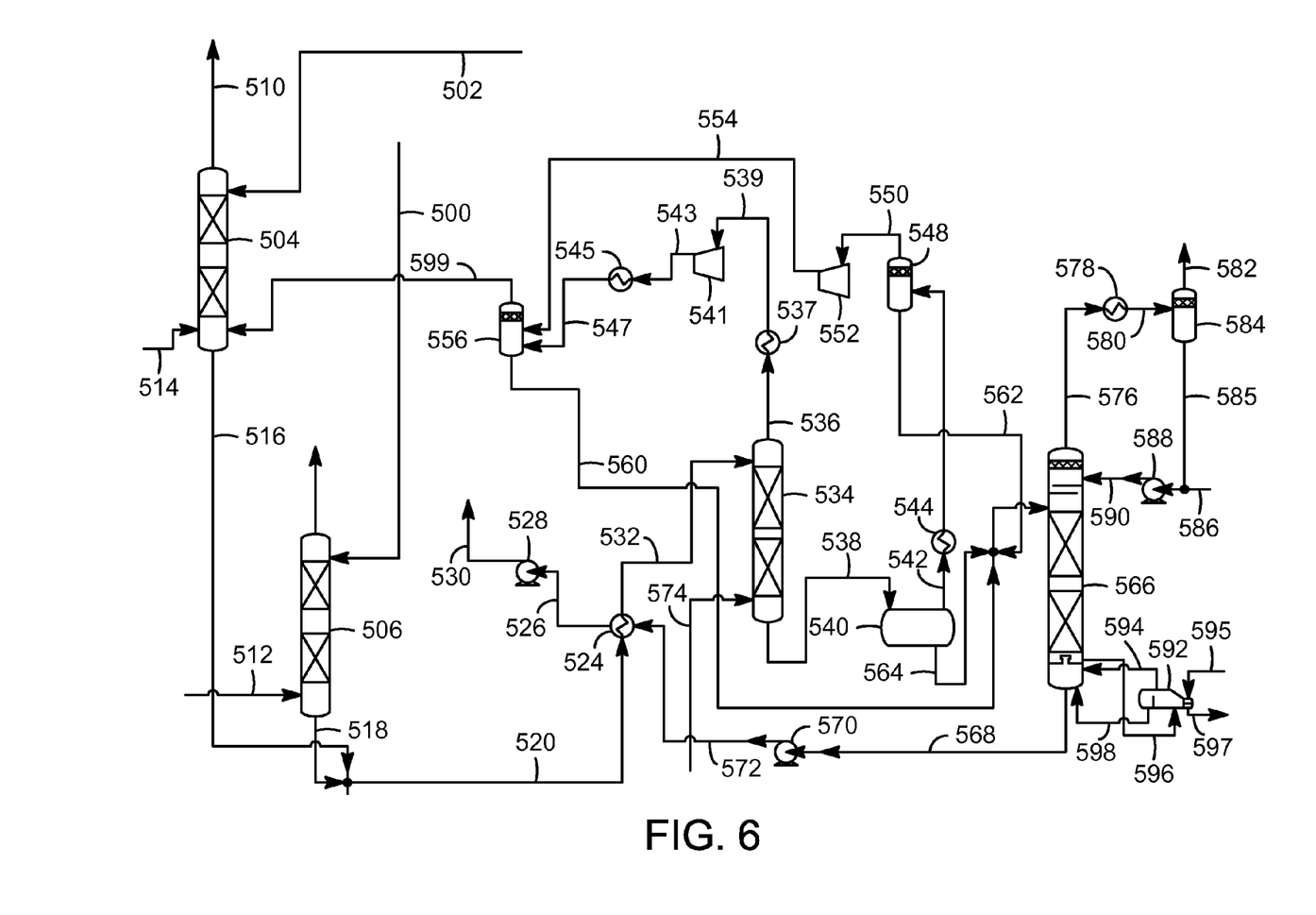
FIG. 6 shows a modification of the sulfur removal section for an absorbent process for processing both shifted and unshifted or partially shifted feeds using separate absorbers for two feed gases but common equipment elsewhere.

The invention is best implemented via the configuration presented in FIG. 4. Since the invention requires modifications in only the $CO_2$ removal section, it is possible to implement via the $CO_2$ removal section configurations appearing in FIG. 4 combined with an $H_2S$ removal section that is configured at the discretion of the engineer, such as shown in FIG. 5 or 6.

In order to understand the present invention, it is useful to first consider a simplified explanation of a system to treat a single synthesis gas stream. FIG. 1 shows a carbon dioxide removal section for an absorbent process for treating a single synthesis gas stream. A solvent or mixture of solvents is used in the process. Among the solvents that can be used are a dimethyl ether of polyethylene glycol, a N-methyl pyrrolidone, a tetrahydro-1,4-oxazine, a methanol, and a mixture comprising diisopropanolamine, tetrahydrothiophene-1,1-dioxide and mixtures thereof. FIG. 1 shows a feed stream 2 of syngas which may be a feed syngas or a syngas feed from a sulfur removal section that is not shown in the figure. The stream 2 is shown entering a lower portion of a carbon dioxide absorber 4 in which the syngas travels in an upward direction while contacting the solvent to remove carbon dioxide and producing a treated syngas 62 that is shown exiting a top portion of carbon dioxide absorber 4. A lean stream 8 of solvent is shown being cooled by chiller 10 and then continuing as stream 12 to enter an upper portion of carbon dioxide absorber 4. Lean stream 8 of solvent is either a fresh stream that has not been employed in the carbon dioxide removal section of the present invention or the lean stream has been regenerated through removal of impurities including carbon dioxide and sulfur compounds. The loaded solvent 14 is shown exiting the bottom of carbon dioxide absorber 4 and pass through a loaded solvent chiller 16 to continue as cooled loaded solvent stream 18 that is either sent to a carbon dioxide removal section that has a series of flash drums and compressors or it may be pumped to a sulfur removal section (not shown) or otherwise disposed of. The portion of the cooled loaded solvent stream 18 that is sent to the carbon dioxide removal section first is shown going to a carbon dioxide recycle flash drum 20 in which a portion of the solvent stream 22 is flashed to a carbon dioxide recycle compressor 24 to continue as compressed stream 26 that is sent to carbon dioxide recycle cooler 28 to return the compressed stream to about the temperature of stream 2 and finally to return to a bottom portion of carbon dioxide absorber 4. A solvent stream 32 is sent from carbon dioxide recycle flash drum 20 to carbon dioxide vent flash drum 34 from which vents purified carbon dioxide stream 36. The solvent stream then continues in line 38 to carbon dioxide vacuum flash drum 40 with carbon dioxide leaving at line 42 to vacuum compressor 44 and to purified carbon dioxide stream 46. A stream of semi-lean solvent that now has a reduced concentration of carbon dioxide is shown in line 48 to be pumped by semi-lean solvent pump 50 to return to a middle portion of carbon dioxide absorber 4 through line 52. The portion of the loaded solvent that exits the carbon dioxide removal section shown in FIG. 1, is sent through line 60 to pump 62 where it is pumped as exiting the system shown at 64.

FIG. 2 is also shown to provide a comparison between the prior art process of FIG. 2 with the process of the invention shown in FIG. 4. FIG. 2 shows the carbon dioxide removal section for an absorbent process for processing both fully shifted and unshifted or partially shifted feeds using separate absorbers for two feed gases but common equipment for other aspects of the process. More specifically, there are shown a first feed 102 and a second feed 124 that are being sent to a first carbon dioxide absorber 104 and a second carbon dioxide absorber 116, respectively. The first feed 102 may be an unshifted or a partially shifted syngas feed or a syngas feed from a sulfur removal section of the process. The second feed 124 may be a fully shifted syngas feed or may be a syngas feed from a sulfur removal section of the process. First feed 102 contacts a solvent as explained in FIG. 1 above in which carbon dioxide is removed from first feed 102 to be dissolved or otherwise contained within the solvent until the solvent is regenerated. A treated unshifted or partially shifted syngas 162 exits the top of carbon dioxide absorber 104. Second feed 124 contacts a solvent in carbon dioxide absorber 116 and a treated fully shifted syngas exits at 118. A lean solvent 108 is cooled by lean solvent chiller 110 and passes through line 112 to lines 114 and 115 to enter a top portion of carbon dioxide absorbers 104 and 116, respectively. Regarding carbon dioxide absorber 104, a loaded solvent stream 168 exits a bottom portion of carbon dioxide absorber 104 and then passes through line 126 to loaded solvent pump 128, to line 130 to loaded solvent chiller 132 and line 134. The loaded solvent stream in line 134 is then either sent in line 136 to be regenerated or to the sulfur removal sections of the process to be used in sulfur removal absorbers. Similar to loaded solvent stream 168 that exits carbon dioxide absorber 104 is shown a second loaded solvent stream 120 that exits carbon dioxide absorber 116. Loaded solvent stream 168 and second loaded solvent stream 120 are combined in line 126. Also shown in FIG. 2 is a portion of the solvent being sent through a series of flash drums to remove a carbon dioxide product. More specifically, a portion of the loaded solvent stream continues through line 138 to carbon dioxide recycle flash drum with an overhead vapor passing through line 142 to carbon dioxide recycle compressor 144 to line 146 to carbon dioxide recycle cooler 148 to line 150 and then to return to bottom portion of carbon dioxide absorber 116. The solvent having a higher proportion of carbon dioxide relative to the overhead vapor in line 142 is sent through line 152 to carbon dioxide medium pressure vent flash drum 154 with a medium pressure flow of carbon dioxide exiting through line 156 and the solvent stream continuing to line 158 to carbon dioxide vacuum flash drum 160. The carbon dioxide exits through line 162 to vacuum compressor 164 and then exits the process in line 166. The solvent which now is considered to be semi-lean is returned to the carbon dioxide absorbers through line 168 to semi-lean solvent pump 170 to line 172. One portion of the semi-lean solvent in line 172 is returned to the first carbon dioxide absorber through line 176 and a second portion of the semi-lean solvent is returned to the second carbon dioxide absorber through line 174.

FIG. 3 generally shows carbon dioxide removal sections of an absorbent process for purifying a gas stream that contains two different feeds such as a shifted and an unshifted or partially shifted feed that minimizes the carbon monoxide content in a carbon dioxide stream that is removed from the feeds. More specifically, there are shown a first feed 102 and a second feed 124 that are being sent to a first carbon dioxide absorber 104 and a second carbon dioxide absorber 116, respectively. The second feed 124 is shown first passing through line 125 prior to entering second carbon dioxide absorber 116. The first feed 102 may be an unshifted or a partially shifted syngas feed or a syngas feed from a sulfur removal section of the process. The second feed 124 may be a fully shifted syngas feed or a syngas feed from a sulfur removal section of the process. In this embodiment of the invention, a portion of a loaded solvent in line 134 from first carbon dioxide absorber 104 is combined with the second feed 124.

First feed 102 contacts a solvent as explained in FIG. 1 above in which carbon dioxide is removed from first feed 102 and then a treated unshifted or partially shifted syngas 162 exits the top of carbon dioxide absorber 104. Second feed 124 contacts a solvent which removes carbon dioxide in carbon dioxide absorber 116 and a treated fully shifted syngas exits at 118. The solvent that is used in the two carbon dioxide absorbers are shown as a lean solvent 108 that is cooled by lean solvent chiller 110 and then passes through line 112 to lines 114 and 115 to enter a top portion of carbon dioxide absorbers 104 and 116 respectively. Regarding carbon dioxide absorber 104, a loaded solvent stream 168 exits a bottom portion of carbon dioxide absorber 104 and then passes through line 126 to loaded solvent pump 128, then to line 130 to loaded solvent chiller 132 and then line 134. The loaded solvent stream is then either sent in line 136 to be regenerated or to the sulfur removal sections of the process to be used in sulfur removal absorbers or a portion from line 134 is combined with second feed 124 in line 125. Similar to loaded solvent stream 168 that exits carbon dioxide absorber 104 is shown a loaded solvent stream 180 that exits carbon dioxide absorber 116. Loaded solvent stream 168 and loaded solvent stream 180 are combined in line 126. Also shown in FIG. 3 is the solvent being sent through a series of flash drums to remove a carbon dioxide product. More specifically a loaded solvent stream 120 exits a bottom portion of carbon dioxide absorber 116 to carbon dioxide recycle flash drum with an overhead vapor passing through line 142 to carbon dioxide recycle compressor 144 to line 146 to carbon dioxide recycle cooler 148 to line 150 and then to return to a bottom portion of carbon dioxide absorber 116. The solvent having a higher proportion of carbon dioxide relative to the overhead vapor in line 142 is sent through line 152 to carbon dioxide medium pressure vent flash drum 154 with a medium pressure flow of carbon dioxide exiting through line 156 and the solvent stream continuing to line 158 to carbon dioxide vacuum flash drum 160. The carbon dioxide stream which contains less than 10% carbon monoxide exits through line 162 to vacuum compressor 164 and then exits the process in line 166. The solvent which now is considered to be semi-lean is returned to the carbon dioxide absorbers through line 168 to semi-lean solvent pump 170 to line 172. One portion of the semi-lean solvent is returned to the first carbon dioxide absorber through line 176 and a second portion of the semi-lean solvent is returned to the second carbon dioxide absorber through line 174.

FIG. 4 shows a carbon dioxide removal section of an absorbent process for processing both shifted and an unshifted or partially shifted feeds that minimize the amount of carbon monoxide in the product carbon dioxide using a carbon monoxide stripping column. At least a portion of solvent from a first and a second carbon dioxide absorber is treated in a carbon monoxide stripping column. A feed 202 that is an unshifted or partially shifted feed or a feed from a sulfur removal section of the process is shown entering a lower portion of carbon dioxide absorber 204. A treated unshifted or partially shifted gas flow 262 exits the upper part of carbon dioxide absorber 204. A flow of solvent containing carbon monoxide exits in line 296 and then is shown entering an upper portion of carbon monoxide stripping column 282. A gas flow containing carbon monoxide then exits carbon monoxide stripping column 282 in line 286 and is shown entering carbon monoxide recycle compressor 288 with a compressed gas passing to line 290 to carbon monoxide recycle cooler 292 to line 294 and then to enter a bottom portion of carbon dioxide absorber 204. A slip stream 298 from a treated fully shifted synthesis gas is shown entering a lower portion of carbon monoxide stripping column 282 and a solvent stream 284 exits a lower portion of carbon monoxide stripping column 282 and then is shown passing to a carbon dioxide medium pressure vent flash drum 254. A stream 256 of product carbon dioxide exits carbon dioxide medium pressure vent flash drum 254. The remaining solvent then passes in line 258 to carbon dioxide vacuum flash drum 260 with carbon dioxide exiting in line 262 to a vacuum compressor 264 with product carbon dioxide shown in line 266 leaving the vacuum compressor 264. The solvent which is now semi-lean following removal of the carbon dioxide then is shown passing in line 268 to a semi-lean solvent pump 270 and then through line 272 with a portion of the solvent going to each of the two carbon dioxide absorbers shown in FIG. 4. More specifically, one portion of semi-lean solvent passes in line 274 to a middle portion of carbon dioxide absorber 216 and a second portion of semi-lean solvent passes in line 276 to a middle portion of carbon dioxide absorber 204. Also shown is a supply of lean solvent 208 that is cooled by chiller 210 to line 212 with one portion of lean solvent 214 entering carbon dioxide absorber 204 and a second portion of lean solvent 215 entering carbon dioxide absorber 216. In regards to carbon dioxide absorber 216, a solvent stream 220 exits as shown at the bottom of carbon dioxide absorber 216 and then either ends up being cooled and returned to carbon dioxide absorber 216, sent to be regenerated or sent to sulfur removal sections of the process that are not shown in FIG. 4. More particularly, the solvent stream 220 is shown going to loaded solvent pump 226 to line 230 to loaded solvent chiller to line 234 and then either to line 236 to either be regenerated or to enter the sulfur removal portions of the process, or a portion of solvent stream 220 may enter the carbon dioxide flash drum section of the process by being sent through line 227 to carbon dioxide recycle flash drum 240. Carbon dioxide gas stream 242 is flashed from carbon dioxide recycle flash drum 240 and then is compressed by carbon dioxide recycle compressor 244 with compressed carbon dioxide stream 246 to be cooled by carbon dioxide recycle cooler 248 and passing through line 250 to carbon dioxide absorber 216. Also shown is a loaded solvent stream 225 that passes through line 225 to carbon dioxide absorber 216 with a stream 224 containing a fully shifted synthesis gas feed or a synthesis gas feed from a sulfur removal section of the process being combined with loaded solvent stream 225.

FIG. 5 shows a sulfur removal section for an absorbent process for processing both a shifted and an unshifted or partially shifted feed using separate absorbers for the two feed gases but common equipment elsewhere. The loaded solvent that is used in the carbon dioxide removal sections of the process can be used in the sulfur removal section of the process. FIG. 5 shows loaded solvent stream 502 from the carbon dioxide removal sections of the process entering an upper portion of a first sulfur absorber 504 that is for sour unshifted or partially shifted syngas. A second sulfur absorber 506 is shown that treats sour fully shifted syngas stream 512. A loaded solvent stream 500 from the carbon dioxide removal sections of the process enters an upper section of second sulfur absorber 506. A feed 514 of sour unshifted or partially shifted syngas enters a lower portion of sulfur absorber 504. An unshifted or partially shifted syngas exits in a gas stream 510 from an upper portion of sulfur absorber 504 to be treated in the carbon dioxide removal section of the process such as shown in FIG. 4. A loaded solvent stream 516 exits from a bottom portion of sulfur absorber 504, then combines with a loaded solvent stream 518 exiting sulfur absorber 506 with the combined loaded solvent stream 520 passing through a lean/rich heat exchanger 524 and then passing through line 532 to hydrogen sulfide concentrator 534. A gas exits in line 536 to be cooled by cooler 537 through line 539 to stripping gas compressor 541 through line 543 to another stripping gas cooler 545 to line 547 to stripping gas knockout drum 556. A vapor stream exits stripping gas knockout drum 556 in line 558 to be sent to sulfur absorber 506. A liquid stream 560 exits the bottom of the stripping gas knockout drum 556 to be sent to hydrogen sulfide stripper 566. In connection with hydrogen sulfide stripper 566 is shown a stripper reboiler 592 which takes a stream 596 of solvent from a bottom portion of the hydrogen sulfide stripper 566 with steam entering in line 595 and a condensed liquid exiting in line 597. After being heated in stripper reboiler 592, a stream is returned to hydrogen sulfide stripper 566 though lines 594 and 598. A vapor stream 576 exits hydrogen sulfide stripper 566 to pass through line 576 to reflux condenser 578 through line 580 to reflux drum 584. Acid gas 582 exits and is sent to a sulfur recovery unit. A liquid stream returned through line 585 to reflux pump 584 plus makeup/purge water 586 to reflux pump 588 to line 590 to hydrogen sulfide stripper 566.

A liquid stream 538 exits hydrogen sulfide concentrator 534 and is sent to a rich flash drum 540. Vapors exit through line 542 to cooler 544 to rich flash gas knock out drum 548. Gas exits in line 550 to be compressed by rich flash gas compressor 552 and then to be sent through line 554 to stripping gas knockout drum 556. Liquid exits rich flash drum 540 through line 564 to be sent to hydrogen stripper 566.

A lean solvent stream 568 exits at the lower end of hydrogen sulfide stripper 566 and is pumped by low pressure lean solvent pump 570 to line 572 through lean/rich heat exchanger 524 to line 526 to high pressure lean solvent pump 528 to be pumped to be used in the carbon dioxide removal section of the process such as shown in FIG. 4.

FIG. 6 shows a sulfur removal section for an absorbent process for processing both shifted and unshifted or partially shifted feeds using separate absorbers for two feed gases but common equipment elsewhere in the process. In this embodiment of the invention, the return flow from the hydrogen sulfide concentrator and rich flash drum overhead are sent to the hydrogen sulfide absorber for partially shifted or unshifted syngas instead of being returned to the absorber for fully shifted syngas as shown in FIG. 5. FIG. 6 shows a sulfur removal section for an absorbent process for processing both a shifted and an unshifted or partially shifted feed using separate absorbers for the two feed gases but common equipment elsewhere. The loaded solvent that is used in the carbon dioxide removal sections of the process can be used in the sulfur removal section of the process. FIG. 6 shows a loaded solvent stream 502 from the carbon dioxide removal sections of the process entering an upper portion of a first sulfur absorber 504 that is for sour unshifted or partially shifted syngas. A second sulfur absorber 506 is shown that treats sour fully shifted syngas stream 512. A feed 514 of sour unshifted or partially shifted syngas enters a lower portion of sulfur absorber 504. An unshifted or partially shifted syngas exits in a gas stream 510 from an upper portion of sulfur absorber 504 to be treated in the carbon dioxide removal section of the process such as shown in FIG. 4. A loaded solvent stream 516 exits from a bottom portion of sulfur absorber 504, then combines with a loaded solvent stream 518 exiting sulfur absorber 506 with the combined loaded solvent stream 520 passing through a lean/rich heat exchanger 524 and then passing through line 532 to hydrogen sulfide concentrator 534. A gas exits in line 536 to be cooled by cooler 537 through line 539 to stripping gas compressor 541 through line 543 to another stripping gas cooler 545 to line 547 to stripping gas knockout drum 556. A vapor stream exits stripping gas knockout drum 556 in line 599 to be sent to sulfur absorber 504. A liquid stream 560 exits the bottom of the stripping gas knockout drum 556 to be sent to hydrogen sulfide stripper 566. In connection with hydrogen sulfide stripper 566 is shown a stripper reboiler 592 which takes a stream 596 of solvent from a bottom portion of the hydrogen sulfide stripper 566 with steam entering in line 595 and a condensed liquid exiting in line 597. After being heated in stripper reboiler 592, a stream is returned to hydrogen sulfide stripper 566 though lines 594 and 598. A vapor stream 576 exits hydrogen sulfide stripper 566 to pass through line 576 to reflux condenser 578 through line 580 to reflux drum 584. Acid gas 582 exits and is sent to a sulfur recovery unit. A liquid stream returned through line 585 to reflux pump 584 plus makeup/purge water 586 to reflux pump 588 to line 590 to hydrogen sulfide stripper 566.

A liquid stream 538 exits hydrogen sulfide concentrator 534 and is sent to a rich flash drum 540. Vapors exit through line 542 to cooler 544 to rich flash gas knock out drum 548. Gas exits in line 550 to be compressed by rich flash gas compressor 552 and then to be sent through line 554 to stripping gas knockout drum 556. Liquid exits rich flash drum 540 through line 564 to be sent to hydrogen stripper 566.

A lean solvent stream 568 exits at the lower end of hydrogen sulfide stripper 566 and is pumped by low pressure lean solvent pump 570 to line 572 through lean/rich heat exchanger 524 to line 526 to high pressure lean solvent pump 528 to be pumped to be used in the carbon dioxide removal section of the process such as shown in FIG. 4.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for separation, recovery and utilization of gas streams comprising sulfur compounds, carbon dioxide and carbon monoxide from a synthesis gas comprising an unshifted synthesis gas or a partially shifted synthesis gas produced from high pressure partial oxidation of a hydrocarbonaceous reactant while removing carbon monoxide from said gas streams and concentrating said CO in an unshifted or partially shifted synthesis gas stream, said process comprising:
   a) contacting the synthesis gas with a first liquid solvent in a first carbon dioxide absorber to selectively absorb and remove at least a portion of carbon dioxide from the synthesis gas and to produce a purified synthesis gas;
   b) sending a portion of said first liquid solvent and a slip stream from a treated fully shifted synthesis gas to a carbon monoxide stripping column to remove carbon monoxide,
   c) returning carbon monoxide to said first carbon dioxide absorber; and
   d) then removing said carbon dioxide from said first liquid solvent to produce a carbon dioxide product stream.

2. The process of claim 1 wherein said synthesis gas is first sent to a sulfur absorber to contact a liquid solvent to remove said sulfur compounds and produce a synthesis gas with a reduced concentration of sulfur compounds.

3. The process of claim 2 wherein a portion of said synthesis gas with a reduced concentration of sulfur compounds is returned to a sulfur absorber for unshifted or partially shifted synthesis gas.

4. The process of claim 1 wherein said shifted synthesis gas is sent to a sulfur absorber unit to contact a liquid solvent to remove said sulfur compounds and produce a shifted synthesis gas with a reduced concentration of sulfur compounds.

5. The process of claim 1 wherein said liquid streams comprise at least one of a dimethyl ether of polyethylene glycol, a N-methyl pyrrolidone, a tetrahydro-1,4-oxazine, a methanol, and a mixture comprising diisopropanolamine and tetrahydrothiophene-1,1-dioxide.

6. The process of claim 1 wherein a loaded solvent stream from a second carbon dioxide absorber is combined with said second feed to form a third stream that is then returned to said second carbon dioxide absorber.

7. The process of claim 5 wherein a loaded solvent stream from said first carbon dioxide absorber is combined with said third stream.

8. The process of claim 1 wherein said carbon dioxide product stream contains less than about 1000 ppm carbon monoxide in addition to carbon dioxide in said carbon dioxide product stream.

9. The process of claim 1 wherein a portion of a loaded solvent is removed from said second absorber to be chilled and a second portion of a loaded solvent is removed from said second absorber to be treated in a carbon dioxide removal zone.

10. A process for producing a gas stream comprising carbon dioxide and less than 1000 ppm carbon monoxide, said process comprising sending a first synthesis gas stream through a first carbon dioxide absorber wherein said first synthesis gas stream comprises an unshifted or partially shifted synthesis gas and sending a second synthesis gas stream through a second carbon dioxide absorber wherein said second synthesis gas stream is a fully shifted synthesis gas stream or a synthesis gas stream from a sulfur removal section of said process, wherein within said first carbon dioxide absorber and said second carbon dioxide absorber said first synthesis gas stream and said second synthesis gas stream contact a solvent to remove carbon dioxide from said first and said second synthesis gas stream and wherein at least a portion of a solvent from said first carbon dioxide absorber and from said second carbon dioxide absorber is treated in a carbon monoxide stripping column.

11. The process of claim 10 wherein said synthesis gas is sent to a sulfur absorber to contact a liquid solvent to remove said sulfur compounds and produce a synthesis gas with a reduced concentration of sulfur compounds.

12. The process of claim 10 wherein said shifted synthesis gas is sent to a sulfur absorber unit to contact a liquid solvent to remove said sulfur compounds and produce a shifted synthesis gas with a reduced concentration of sulfur compounds.

13. The process of claim 10 wherein said liquid streams comprise at least one of a dimethyl ether of polyethylene glycol, a N-methyl pyrrolidone, a tetrahydro-1,4-oxazine, a methanol, and a mixture comprising diisopropanolamine and tetrahydrothiophene-1,1-dioxide.

14. The process of claim 10 wherein a loaded solvent stream from said second carbon dioxide absorber is combined with said second feed to form a third stream that is then returned to said second carbon dioxide absorber.

15. The process of claim 14 wherein a loaded solvent stream from said first carbon dioxide absorber is combined with said third stream.

16. The process of claim 10 wherein said carbon dioxide product stream contains less than about 1000 ppm carbon monoxide in addition to carbon dioxide in said carbon dioxide product stream.

17. The process of claim 10 wherein a portion of a loaded solvent is removed from said second absorber to be chilled and a second portion of a loaded solvent is removed from said second absorber to be treated in a carbon dioxide removal zone.

* * * * *